July 24, 1962  J. W. WOODS  3,045,355
PLOW DEPTH INDICATOR
Filed Oct. 26, 1959
FIG. 1
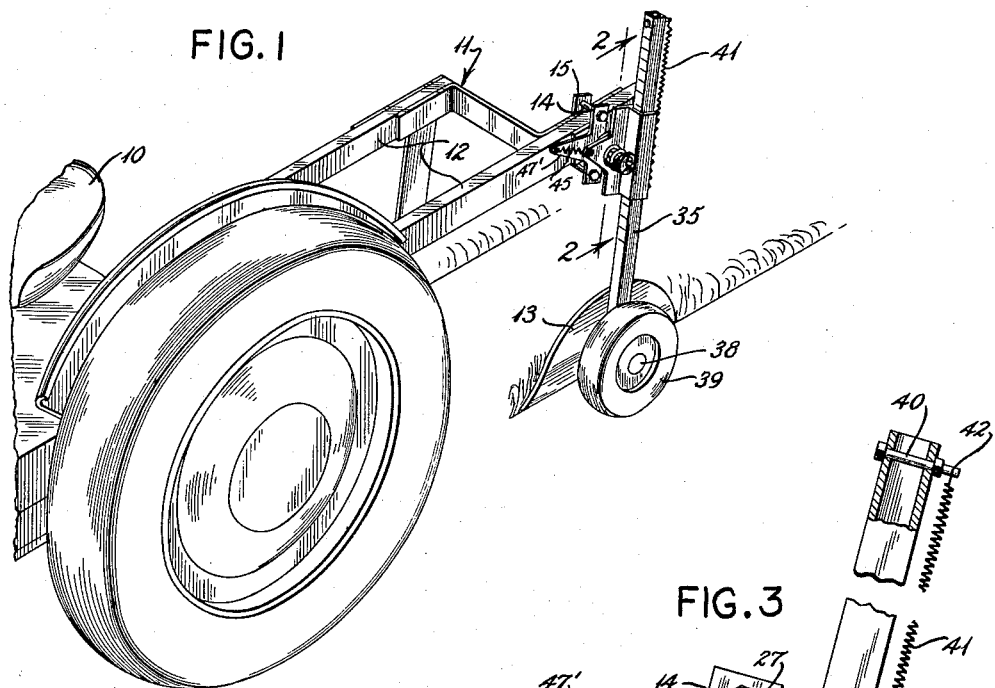
FIG. 3
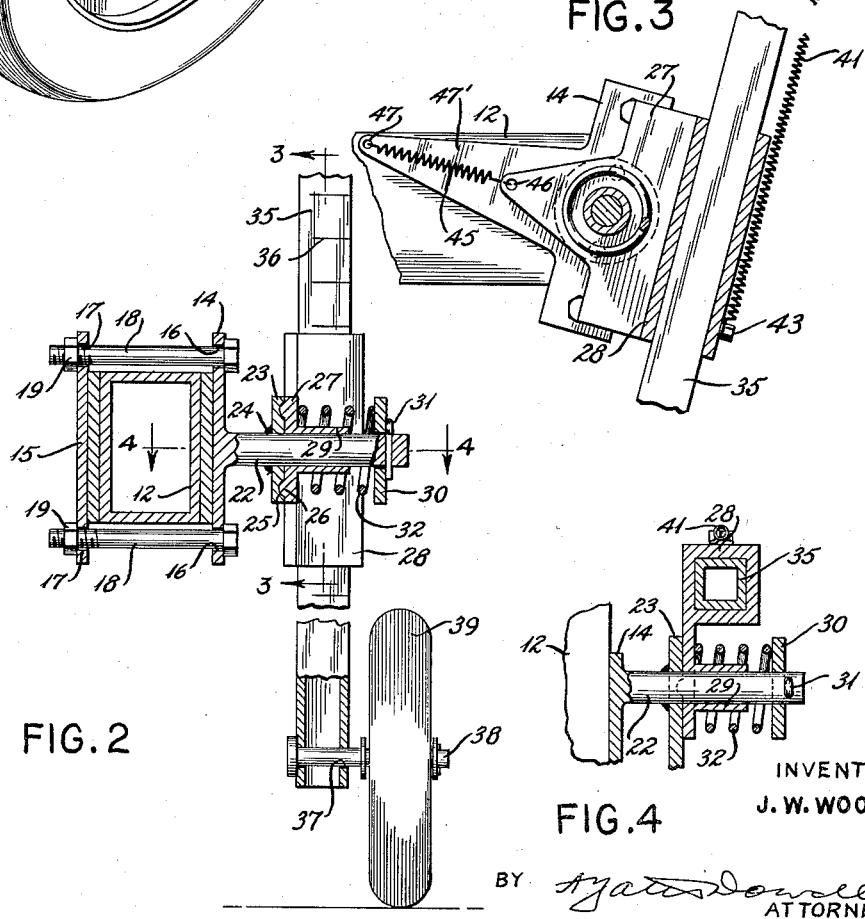
FIG. 2
FIG. 4
INVENTOR
J. W. WOODS
BY
ATTORNEY United States Patent Office 3,045,355
Patented July 24, 1962

3,045,355
PLOW DEPTH INDICATOR
John W. Woods, R.D. 2, Gettysburg, Pa.
Filed Oct. 26, 1959, Ser. No. 848,717
4 Claims. (Cl. 33—185)

This invention relates to the cultivation of the soil and to the equipment employed in such cultivation and particularly to plows and devices for controlling the operations thereof and especially the depth plowed.

The invention relates specifically to a plow depth indicator for use with a plow pulled by a tractor or the like and which plow and depth indicator come in contact with obstructions of various types and sizes and which affect operation of the plow and associated mechanism.

Plows heretofore in use have not had satisfactory depth gauges which could be readily observed, kept in usable condition and not incapacitated by encountering obstructions in the area plowed.

It is an object of the invention to provide a simple, inexpensive plow depth indicator which can be readily manufactured of relatively few parts, easily applied including to a conventional plow, easily viewable by the operator, and which will satisfactorily indicate the depth at which a plow operates.

Another object of the invention is to provide a depth indicator for a plow which will operate to permit the depth indicator to ride over a small obstruction and to yield when a sufficiently large obstruction is encountered and swing rearwardly sufficiently to pass the obstruction and then return to its initial position.

Other objects and advantages of the invention will be apparent from the following description taken in conjunction with the accompanying drawings, in which:

FIG. 1 is a perspective illustrating one application of the invention;

FIG. 2, an enlarged section on the line 2—2 of FIG. 1;

FIG. 3, a section on the line 3—3 of FIG. 2; and

FIG. 4, a section on the line 4—4 of FIG. 2.

Briefly stated, the invention is a plow depth indicator applicable to a plow pulled by a tractor or the like and which plow has rearwardly extending beams from which the points of the plow are suspended or supported. The plow depth indicator includes a wheel on the lower end of an adjustable post carried in a bracket attached by a pivot to a second bracket on the beam of the plow and with a pair of coacting members having cooperating depressions and projections and spring means for maintaining the parts in a definite relation but such spring means urging said parts together allowing the relative movement of the parts and the additional spring tending to return the parts to their original position.

With continued reference to the drawing, a vehicle such as a tractor 10 is adapted to have a plow 11 attached thereto in a manner that the plow can be pulled through a field.

The plow 11 is provided with rearwardly extending beams 12 from which the plow points 13 are suspended. The plow depth indicator of the present invention is mounted on one of the outside beams and preferably on the land side or the side opposite the furrow being turned over by the plow blade.

The device of the present invention comprises a pair of clamp bars or plates 14 and 15 somewhat longer than the width of beams 12. Such bars are provided with openings 16 and 17 in the ends thereof, through which are received a pair of bolts 18 and nuts 19 for clamping the bars 14 and 15 together with the beams 12 therebetween. A stub shaft 22 may be welded or otherwise attached to the outer face of the plate 14 and is adapted to project substantially at right angles thereto.

A disk 23 is mounted on the stub shaft 22 and secured by welds 24 and is provided with a pair of oppositely disposed recesses or depressions 25 in which a pair of cooperating enlargements or projections 26 carried by a plate 27 are received. The plate 27 is an extension of one side of a hollow elongated sleeve 28 square in cross section and such plate is provided with a bearing 29 for mounting the plate 27 and the square sleeve 28 on the stub shaft 22.

In order to maintain the projections 26 within the recesses 25 a movable disk 30 is disposed about the shaft 22 adjacent its free end and such movable disk is retained in place by a cotter pin 31. A locking spring 32 is disposed between the movable disk 30 and the plate 27 normally to maintain the projection 26 within the recess 25.

An elongated hollow tubular post 35 also square in cross section with indicia 36 along its forward edge is slidably mounted within the sleeve 28. The lower end of the post 35 is provided with an opening 37 in which is received a spindle 38 of a ground-engaging wheel 39. The upper end of the post 35 is provided with a bolt and nut 40 to prevent the post from sliding from the sleeve when the plow 11 is raised. In order to maintain the ground-engaging wheel 39 in constant contact with the ground a spring 41 is provided along the rear of the post 35 with the upper end of the spring being retained within an opening 42 in the bolt 40 and the lower end of the spring being connected to the sleeve 28 by a screw 43.

The device is preferably mounted so that the sleeve and the post are normally at a slight angle to the vertical with the wheel 39 disposed forwardly of the shaft 22 so that in operation when the ground-engaging wheel encounters a small obstruction the wheel will ride over such obstruction against the tension of the spring 41 without placing undue strain on the sleeve. When a larger obstruction is encountered the sleeve 28 and the post 35 are adapted to pivot about the stub shaft 22 when the movement of the plow disengages the projections 26 from the recesses 25 against the pressure of the spring 32. When the obstruction has been passed the post and the sleeve must be returned to their original positions, and this is accomplished by a return spring 45 having one end engaged in an opening 46 in the plate 27 and the opposite end engaged in an opening 47 in a lug 47' projecting from the plate 14 in a manner to return the projections into cooperative engagement with the recesses regardless of the direction of travel of the tractor.

If desired, the indicia or markings along the face of the tube 35 may be colored for increased visibility and will be kept clean by the sliding of the tube within the sleeve.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A plow depth indicator for attachment to a plow having a beam comprising a clamp for attaching the indicator to the beam, a stub shaft carried by said clamp, a fixed and a movable disk mounted on said shaft, said fixed disk having a pair of recesses therein, a hollow square sleeve having a plate projecting from one side theeof, a bearing carried by said plate and in engagement with said shaft to permit rotary and axial movement of said sleeve, a pair of projections on said plate for cooperative engagement with said recesses in said fixed disk, spring means between said movable disk and said plate for normally maintaining said projections and recesses in cooperative engagement, a hollow square tube mounted within said sleeve and movable axially thereof, a ground-engaging wheel carried by said tube, spring means urging said ground-engaging wheel into contact with the ground, said sleeve and said tube being adapted to pivot about said shaft when a large obstruction is encountered, and equally spaced markings on one side of said tube whereby the operator of said tractor can determine the depth of the plow at a glance.

2. A plow depth indicator comprising a clamp for attaching the indicator to a plow, a stub shaft carried by said clamp, fixed and movable members having cooperating surfaces mounted on said stub shaft one fixed to the stub shaft and the other movable relative thereto, said members having complementary projections and recesses whereby they are adapted to be disposed in a definite relation, said movable member having a lateral bearing forming portion, spring means urging said members toward each other so that the projections and recesses will cooperatively engage, a sleeve attached to said movable member, a post axially slidable in said sleeve, a ground-engaging wheel carried by said post, spring means urging said ground-engaging wheel into contact with the ground, said sleeve and said post being adapted to pivot about said stub shaft when an obstruction is encountered, and equally spaced indications on one side of said post for ready observation by the operator to determine the depth of the plow.

3. A plow depth indicator comprising a member for attachment to a plow, a second member for cooperation with the first, resilient means urging said members towards each other, means tending to dispose said members in a definite position one relative to the other while permitting the second to move relative to the first upon the application of sufficient force by an obstruction to overcome said means tending to dispose, a post adjustably carried by the second member, indicia by which the adjustment of the post can be determined, a ground-engaging wheel carried by the post, and spring means tending to return said members to their initial relation.

4. A plow depth indicator comprising a fastener for attaching the indicator to a plow, shaft means carried by said fastener, fixed and movable members having cooperating surfaces mounted on said shaft means, one fixed to the said shaft means and the other movable relative thereto, said members having a lateral bearing forming portion, means urging said members toward each other so that said cooperating surfaces will engage, a first part carried by said movable member, a second part movable relative to the first, a ground-engaging wheel carried by said second part, means urging said ground-engaging wheel into contact with the ground, said first and second parts being adapted to move about said shaft means when an obstruction is encountered, and equally spaced indications on one side of said second part for ready observation by the operator to determine the depth of the plow.

References Cited in the file of this patent
UNITED STATES PATENTS

| | | |
|---|---|---|
| 1,679,473 | Kabisius | Aug. 7, 1928 |
| 2,654,339 | Sperling | Oct. 6, 1953 |
| 2,718,837 | Schierman | Sept. 27, 1955 |